UNITED STATES PATENT OFFICE.

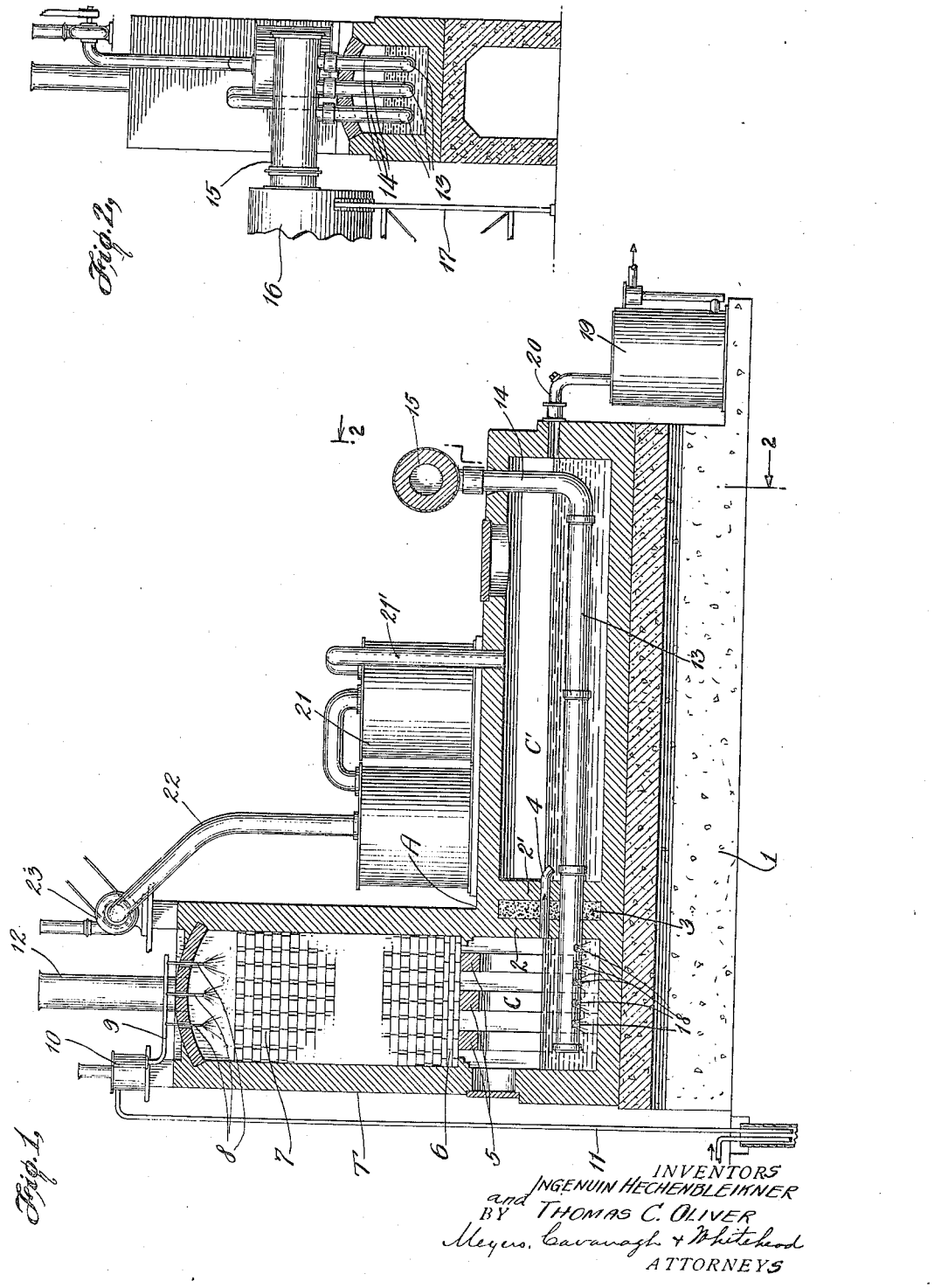

INGENUIN HECHENBLEIKNER AND THOMAS C. OLIVER, OF CHARLOTTE, NORTH CAROLINA, ASSIGNORS TO CHEMICAL CONSTRUCTION COMPANY, OF NEW YORK, N. Y., A CORPORATION OF NORTH CAROLINA.

METHOD OF TREATING SLUDGE ACIDS.

1,423,767. Specification of Letters Patent. Patented July 25, 1922.

Application filed January 25, 1922. Serial No. 531,605.

*To all whom it may concern:*

Be it known that we, INGENUIN HECHENBLEIKNER and THOMAS C. OLIVER, citizens of the United States, and residents of Charlotte, in the county of Mecklenburg and State of North Carolina, have invented certain new and useful Improvements in Methods of Treating Sludge Acids, of which the following is a specification.

This invention relates to a method of treating sludge acids or separated sludge acids obtained in the refining of mineral oils and relates more particularly to the concentration and purifying of the sludge acids; and has special reference to the provision of a method of treating the acids especially adapted for inexpensive and relatively low capacity plants.

As is known, crude petroleum oil or its fractional distillates is refined by subjecting the same to the action of sulphuric acid so that the latter will absorb the heavy hydrocarbons and other undesirable elements present in the crude oil. In practice the sulphuric acid so used has an initial strength of about 66 degrees Baumé or stronger, but at the completion of the operation and after the refined oil has been separated, there remains a sludge or spent acid which not only contains the impurities removed from the oil, but is also of a reduced strength, usually about 50 degrees Baumé, due to the fact that the acid has absorbed a certain amount of water and has given up a certain amount of $SO_2$. during the refining process. This sludge acid or sludge is generally then subjected to further dilution with steam and water in the operation of recovering such oil as may remain therein and for the purpose of relieving the acid as much as possible of its absorbed impurities, this treatment separating the sludge or sludge acid into a sludge oil and a separated sludge acid. This secondary treatment results in further diluting the acid and in producing a separated sludge acid which may have a strength of about 30 degrees Baumé, the separated sludge acid being mixed with a considerable amount of hydrocarbon impurities.

In a process recently invented by us and disclosed in copending applications Serial No. 477,936 of June 16, 1921 and Serial No. 527,532 of January 7, 1922, the sludge acid or separated sludge acid is treated in two stages for effecting the reclaiming thereof and effecting, more specifically, the concentration and purification of the acid, the acid being heated and agitated in the first stage as by bubbling hot air or hot gases therethrough at temperatures substantially below the true boiling point of the acid, the acid being concentrated in this first stage preferably to a strength at or slightly below the coking or foaming point of the acid, considerable of the hydrocarbon impurities being oxidized, driven off and otherwise eliminated in this first stage, the partially concentrated and purified acid being then treated in a second stage and preferably in a manner similar to the treatment in the first stage with the acid heated and agitated at temperatures below the true boiling point thereof for effecting completion of the concentration of such acid. This method has been found highly efficient for treating large bodies of the sludge acid, a plant built according to this method being capable of treating, say, from 20 to 60 tons of acid a day. For smaller capacity plants, however, it has been found that the installation of a system as shown in the said applications is too expensive and involves too great a cost of layout and upkeep. It has therefore been found desirable where, say, a five ton capacity plant is desired, to provide a modified method and apparatus for treating the acid in two concentrating steps or stages and the provision of such a method and apparatus is a prime desideratum of our present invention.

The principal objects of our present invention may be said to include, besides the provision of a method and apparatus capable of producing the results hereinbefore referred to, the further provision of a method and apparatus in which a bath of the acid is subjected to heat and agitation in the first concentrating stage, the acid being concentrated at temperatures substantially below the true boiling point thereof as by means of bubbling hot air or hot gases through a body of the same, concentration being effected to an intermediate strength, the partially concentrated acid being then highly heated at temperatures close to the true boiling point thereof to effect the completion of concentration of the said acid and the provision of a method and apparatus of this nature which may be practiced with great efficiency, economy and convenience.

To the accomplishment of the foregoing and such other objects as may hereinafter appear, our invention consists in the method and the various steps as hereinafter particularly described and sought to be defined in the claims, reference being had to the accompanying drawings, in which:

Figure 1 is a cross sectional view of the apparatus we prefer to use in the practice of our method, and Figure 2 is a cross sectional view thereof taken on the line 2—2, Figure 1.

In the practice of our method the weak sludge acid is first collected in a bath and is concentrated to a strength of, say, between 47 and 57 degrees Baumé, hot air or hot gases being caused to bubble through the acid for effecting this concentration, this taking place at temperatures substantially below the true boiling point of the acid. Into this bath is fed the weak sludge acid of about 30 degrees Baumé, the said weak acid trickling down through a tower of checkerwork or the like, the spent gases issuing from the above mentioned bath, moving up the said tower and effecting the preheating of the downcoming weak feed acid, the preheating being preferably so carried on as to volatilize the higher hydrocarbons and the $SO_2$ content in the acid. In the heating and concentrating of the acid in the bath considerable of the impurities are oxidized, driven off or otherwise eliminated and the partially concentrated and purified acid is caused to flow into a second bath in which the acid undergoes treatment in the second step or stage. In this second stage the partially concentrated acid is highly heated, preferably in a static or quiescent condition, the acid being concentrated in this second stage to its full strength of, say, about 66 degrees Baumé, the acid being here treated at temperatures close to its true boiling point.

Referring now to the accompanying drawings which show the apparatus we prefer to use in the practice of our method, we provide the acid recovery plant A supported on the foundation 1, the latter being of any suitable character and constructed preferably of concrete or similar material and reinforced if found desirable. The acid recovery plant A is preferably constructed of any suitable acid-proof material such as acid-resisting silicate bricks laid in acid-proof mortar and the said plant is divided into two sections or compartments C and C' by means of the spaced partitions or walls 2 and 2' having therebetween an intermediate layer, preferably of sand, 3, the said partitions 2 and 2' separating the compartments C and C' and insulating one from the other. For effecting communication between the said compartments C and C' to permit the acid in one compartment to flow into the other, we provide a plurality of intercommunicating ports 4, one of which is shown in the drawings, the acid in compartment C being adapted to flow through these ports into the compartment C' as indicated by the arrow in the drawings, the ports being preferably located a slight distance above the normal liquid level in the compartments.

Communicating with the compartment C we provide the tower T which may be of any well known construction and in the present instance is provided at its lower portion with spaced arches 5 of acid-proof brick set in acid-proof cement and designed to support a bridge 6 composed of parallel rows of bricks, the bridge, in turn, sustaining the brick checker-work 7, which may be loosely or closely packed, depending upon the amount of carbon impurities in a given sludge acid. At its top the tower T is provided with the acid spraying inlet pipes 8 connected to the common pipe 9, the latter communicating with a blow box 10 receiving the supply of weak acid from an intake pipe 11. Connected to the roof of the tower T we also provide the outlet pipe 12 for the escape of spent gases, as will appear presently. The weak spent acid to be concentrated and purified is introduced into the top of the tower through the acid inlet pipe sections 8 and trickle down over and through the packing and the checker-work, passing into the section C of the reclaiming plant, the acid here collecting for the first concentrating and purifying treatment, the acid flowing from this compartment to the chamber C' for undergoing the second concentrating and purifying treatment.

In order to internally heat the acid for the purpose of concentrating and purifying the same we employ a suitable heater and in the present instance such heater comprises a plurality of parallel horizontally disposed pipes 13 extending substantially the length of the reclaiming plant A, these pipes being preferably supported intermediate their ends by means of the baffle walls 2 and 2' while at the outer ends the said heater pipes are supported and connected to vertical pipe sections 14 which are in turn connected to a manifold 15 receiving a supply of heated gases or heated air from a furnace such as 16, the latter supported on a frame work such as 17. The portions of the pipe sections 13 lying within the first chamber C are provided with a plurality of spaced perforations or orifices 18 functioning as ports for the escape of the hot gases flowing through the pipes 13, the said hot gases bubbling through the bath in the chamber C, heating and agitating the acid therein. The temperatures of the gases flowing through the pipes are preferably so controlled and the weak acid fed through the inlet pipes 8 is so controlled as to effect the concentration of the acid in the compartment C to a strength preferably between 47 and 57 degrees Baumé or thereabouts, the temperature of this bath being preferably between 230 and 300 degrees F. The spent gases issuing from the bath in this chamber C move up through the tower T and preheat the weak feed acid flowing down therethrough, the preheating being so effected as to drive off the more volatile hydrocarbons and the $SO_2$ content in the acid. In the treatment of the acid in the first bath of the chamber C considerable of the remaining hydrocarbon impurities are oxidized, driven off or otherwise eliminated. The now partially concentrated acid flows through the ports 4 into the bath in the second chamber C' and here the temperature is regulated and controlled to effect the completion of concentration of the acid up to about 66 degrees Baumé, the temperature in this bath being, for example, from 540 to 560 degrees F. or thereabouts. After the concentration of the acid in the two stages the acid is collected in coolers 19, these coolers communicating with the concentrating chamber C' by means of the piping 20. For the purpose of reclaiming or recovering any $H_2SO_4$ which is broken up in the treatment of the acid in the second stage, we preferably provide the condensing apparatus 21, communicating with the concentrating chamber C' by means of the intake or induction pipe 21', the exhaust or eduction pipe 22 connecting the condensors 20 to a blower or exhauster 23.

The practice of our process and the operation of our apparatus will, in the main, be apparent from the above detailed description thereof. The weak acid is preheated in the tower T and fed into the first bath into the concentrating chamber C wherein the acid is subjected to heat treatment and agitation to effect a partial concentration and purification thereof up to, for example, between 47 and 57 degrees Baumé, the acid being then conducted into the second concentrating chamber C' where the acid is subjected to heat treatment without agitation at high temperatures to effect the completion of concentration thereof. This apparatus and this method has been found highly efficient and economical for use with low capacity sludge recovery plants and may be operated with extreme facility.

While we have shown our apparatus and described our method in the preferred form and manner, it will be obvious that many changes and modifications may be made without departing from the spirit of the invention, defined in the following claims.

We claim:

1. The method of treating sludge acids or separated sludge acids which consists in heating and agitating a body of the acid thereby effecting a partial concentration of the same and in then heating a body of the partially concentrated acid without agitation effecting a further concentration thereof.

2. The method of treating sludge acids or separated sludge acids which consists in heating and agitating a body of the acid thereby effecting a partial concentration of the same to a strength at or below the foaming point thereof and in then heating a body of the partially concentrated acid without agitation effecting a further concentration thereof.

3. The method of treating sludge acids or separated sludge acids which consists in heating and agitating a body of the acid of about 30 degrees Baumé thereby effecting a partial concentration of the same up to about 47 to 57 degrees Baumé and in then heating a body of the partially concentrated acid without agitation effecting a concentration thereof to about 66 degrees Baumé.

4. The method of treating sludge acids or separated sludge acids which consists in preheating a weak acid to drive off the more volatile impurities therein, in heating and agitating a body of the preheated acid thereby effecting a partial concentration thereof and in then heating a body of the partially concentrated acid without agitation effecting a completion of the concentration thereof.

5. The method of treating sludge acids or separated sludge acids which consists in bubbling hot air or hot gases through a body of the acid thereby effecting a partial concentration thereof and in then heating a body of the partially concentrated acid without agitation effecting a further concentration thereof.

6. The method of treating sludge acids or separated sludge acids which consists in bubbling hot air or hot gases through a body of the acid thereby effecting a partial concentration thereof and in then heating a body of the partially concentrated acid by conducting heated gases therethrough without agitation effecting completion of the concentration thereof.

7. The method of treating sludge acids or separated sludge acids which consists in bubbling hot air or hot gases through a body of the acid thereby effecting a partial concentration thereof to a strength at or below the foaming point thereof and in then heating a body of the partially concentrated acid without agitation effecting a further concentration thereof.

8. The method of treating sludge acids or separated sludge acids which consists in bubbling hot air or hot gases through a body of the acid of about 30 degrees Baumé thereby effecting a partial concentration thereof up to about 47 to 57 degrees Baumé and in then heating a body of the partially concentrated acid without agitation, effecting a concentration thereof up to about 66 degrees Baumé.

9. The method of treating sludge acids or separated sludge acids which consists in preheating weak acid to drive off the more volatile impurities, in bubbling hot air or hot gases through a body of the preheated acid thereby effecting a partial concentration of the same and in then heating a body of the partially concentrated acid without agitation effecting a completion of the concentration thereof.

10. The method of treating sludge acids or separated sludge acids which consists in feeding a weak sludge acid into a bath, in bubbling hot air or hot gases through the said bath thereby effecting a partial concentration of the acid, the spent gases preheating the incoming weak feed acid and in then heating a body of the partially concentrated acid without agitation effecting a further concentration thereof.

11. The method of treating sludge acids or separated sludge acids which consists in first passing weak acid countercurrent to heated gases in a tower and collecting the preheated acid in a bath, in bubbling hot air or gases through the said bath thereby effecting a partial concentration of the acid to an intermediate strength, in passing the so treated acid into an adjacent bath and in heating the latter bath to a higher temperature while in a static condition to complete the concentration of the acid.

12. The method of treating sludge acids or separated sludge acids which consists in heating and agitating a weak sludge acid thereby effecting a partial concentration thereof at temperatures substantially below the boiling point of the acid and in then heating the partially concentrated acid at a higher temperature and close to the boiling point of the acid for effecting a further concentration thereof.

13. The method of treating sludge acids or separated sludge acids which consists in bubbling hot air or hot gases through a body of a weak sludge acid thereby effecting a partial concentration thereof at temperatures substantially below the boiling point of the acid and in then heating the partially concentrated acid at a higher temperature and close to the boiling point of the acid for effecting a completion of the concentration thereof.

Signed at New York city in the county of New York and State of New York, this 11th day of January, A. D. 1922.

INGENUIN HECHENBLEIKNER.
THOMAS C. OLIVER.